US011067483B2

(12) United States Patent
Sunada et al.

(10) Patent No.: US 11,067,483 B2
(45) Date of Patent: Jul. 20, 2021

(54) HYBRID COOLER/DRYER AND METHOD THEREFOR

(71) Applicant: Perma Pure LLC, Lakewood, NJ (US)

(72) Inventors: Craig Sunada, Manasquan, NJ (US); Cui Jun, Shanghai (CN); Yuan Lin, Shanghai (CN); Robert Laemmle, Lakewood, NJ (US)

(73) Assignee: Perma Pure LLC, Lakewood, NJ (US)

( * ) Notice: Subject to any disclaimer, the term of this patent is extended or adjusted under 35 U.S.C. 154(b) by 185 days.

(21) Appl. No.: 16/370,559

(22) Filed: Mar. 29, 2019

(65) Prior Publication Data

US 2019/0339172 A1 Nov. 7, 2019

Related U.S. Application Data

(60) Provisional application No. 62/650,482, filed on Mar. 30, 2018.

(51) Int. Cl.
*G01N 1/22* (2006.01)
*B01D 53/22* (2006.01)
*B01D 53/26* (2006.01)
*B01D 69/04* (2006.01)
*B01D 71/66* (2006.01)

(52) U.S. Cl.
CPC ......... *G01N 1/2205* (2013.01); *B01D 53/228* (2013.01); *B01D 53/266* (2013.01); *B01D 69/04* (2013.01); *B01D 71/66* (2013.01); *B01D 2053/223* (2013.01); *G01N 2001/2282* (2013.01)

(58) Field of Classification Search
CPC ......... G01N 1/2205; G01N 2001/2282; B01D 53/228; B01D 53/266; B01D 69/04; B01D 53/265; B01D 53/268
See application file for complete search history.

(56) References Cited

U.S. PATENT DOCUMENTS

| 6,220,245 B1 | 4/2001 | Takabayashi et al. | |
| 2005/0241178 A1* | 11/2005 | Arbeiter | F26B 21/086 34/468 |
| 2005/0247619 A1 | 11/2005 | Berger et al. | |
| 2007/0039464 A1* | 2/2007 | Vanderhoof | B01D 53/268 95/45 |
| 2010/0122552 A1 | 5/2010 | Schwartz et al. | |
| 2015/0362468 A1* | 12/2015 | Gerhold | G01N 33/0016 73/28.04 |

OTHER PUBLICATIONS

Authorized Officer Lee W. Young, International Search Report and Written Opinion dated Jul. 16, 2019 issued in PCT Patent Application No. PCT/US2019/025008.

* cited by examiner

*Primary Examiner* — David Z Huang
(74) *Attorney, Agent, or Firm* — Kaplan Breyer Schwarz, LLP

(57) ABSTRACT

A hybrid cooler/dryer that conditions a sample gas includes a heat exchanger, a condensate-removal device, and a membrane dryer. In some embodiments, the hybrid cooler/dryer also includes passive cooling, as embodied by an air amplifier and heat sink, or a length of tubing that exposes the sample gas to ambient temperature. The hybrid cooler/dryer requires no electrical power.

23 Claims, 7 Drawing Sheets

HYBRID COOLER/DRYER AND METHOD THEREFOR

STATEMENT OF RELATED CASES

This disclosure claims priority to U.S. Pat. App. Ser. 62/650,482, filed on Mar. 30, 2018 and incorporated by reference herein.

FIELD OF THE INVENTION

The present invention pertains to pretreating gas samples prior to analysis.

Background of the Invention

Regular and accurate analysis of process streams is essential to efficiently operating a power plant, petrochemical plant, or petroleum refinery. Regardless of the manner in which it is processed, a gaseous process or emissions stream flowing through a pipeline typically contains pollutants (e.g., oxides of nitrogen and sulfur, etc.), particulates, and moisture as well as other vapors.

When temperatures inside the pipeline cool, moisture and other vapors in the sample may condense, causing some of the containments and the condensed vapors to coalesce. Continuous process analyzers that draw samples from such streams may be exposed to the condensate, which can cause them to fail.

When warm samples (c.a., 80° C.) are drawn, the presence of condensable water vapor can be particularly problematic. Specifically, certain components of interest, such as sulfur dioxide, readily dissolve in liquid water. The sample cools as it travels through tubing that couples the piping to the process analyzer. As this occurs, some of the water vapor in the sample condenses, taking some of the sulfur dioxide from the sample gas with it. This results in an inaccurate (low) reading for sulfur dioxide in the sample stream. Furthermore, the dissolved sulfur dioxide reacts with water to form sulfuric acid, which can corrode equipment. Consequently, it is important to condition a sample by removing at least some of the moisture and particulates before it enters a process analyzer.

There are several approaches for removing moisture from sample gas streams. One such approach uses a water trap, which is an inexpensive device located in-line with the gas flow to the analyzer. This device removes condensed water from the gas stream as the temperature of the gas cools toward ambient, but does not dry the gas further. A water trap is very non-specific; in addition to removing whatever gases condense at the prevailing temperature, it also removes any vapors/gases, such as sulfur dioxide, dissolved in the condensate. This affects the accuracy of the downstream gas analysis, as well as creating the potential for the aforementioned corrosion problem.

Another option is a desiccant dryer, which functions by binding water to an absorbent. The absorbent may be a solid, such as silica gel, or a liquid, such as sulfuric acid, which binds water to its chemical structure as water-of-hydration. Desiccants are very simple to operate but, like water traps, they are very non-specific and so remove many compounds other than water. Unlike water traps, water cannot be removed from desiccants by simple draining. Desiccants therefore become progressively loaded with water and require periodic regeneration. For most analyzer applications, this entails a regular change-out of the desiccant, which is time consuming and expensive over the life of the analyzer.

Perhaps the most commonly used devices for moisture removal are Peltier or thermoelectric condensing coolers. These devices cool a gas stream until water and other liquids condense, and then collect and drain the condensate. Like water traps, they are very non-specific, removing all condensate as well as any gases dissolved therein. These coolers are a relatively expensive option due to their high capital cost, as compared to the other options, in addition to requiring regular repair or replacement. Condensing coolers typically dry to around a 4° C. dew point.

Membrane drying systems, such as those utilizing a sulfonated tetrafluoroethylene based fluoropolymer-copolymer, for example perfluorosulfonic acid (PFSA), and in particular Nafion™ tubing, provide a very selective option for moisture removal from gas streams.

In operation, a "purge gas" consisting of relatively dry ambient air or instrument air is drawn, sometimes under vacuum, across the exterior of Nafion™ tubing while the relatively wetter gas sample flows through the tubing. The temperature at the inlet of the dryer is controlled to a temperature than is higher than the expected dew point of the gas sample. The difference in the vapor pressure of water between gas sample and the purge gas drives moisture, but not other analytes that are present, from the sample into the purge gas.

Although existing Nafion™-based drying systems are exceedingly selective for moisture removal, they are relatively sophisticated systems. For example, some such systems include separate temperature-controlled zones with multiple heaters, multiple particulate filters, and a relatively sophisticated control system.

In light of the foregoing, there is a need for an improved system and method for conditioning gas samples.

SUMMARY OF THE INVENTION

The present invention provides a method and apparatus for conditioning a sample gas without some of the costs and drawback of existing approaches.

In particular, the inventors sought to develop a conditioning system that offered the following features:
selective removal of water;
minimal maintenance; and
low cost.

Furthermore, the inventors sought to provide a system that includes only passive devices; that is, nothing powered by electricity. This is advantageous because in an explosive environment, there are restrictions on the use of electrically powered devices. Thus, the inventors rejected the use of a fan for cooling; rather, in such restricted environments, the present system uses only passive cooling approaches.

Additionally, the inventors recognized that since the solubility of sulfur dioxide increases as temperature decreases (which is the opposite of typical solubility behavior), operating a conditioning system at a relatively higher temperature ought to result in a more accurate appraisal of the sulfur dioxide in the process stream being sampled. That is, at relatively higher operating temperature, (a) relatively less condensate results, and (b) due to the aforementioned solubility relation, relatively less sulfur dioxide will be present in the condensate.

In accordance with the present teachings, a hybrid cooler/dryer includes arrangements/devices for providing: passive heat exchange, optional passive cooling, condensate and particulates removal, and membrane drying. In some cases, the hybrid cooler/dryer is permanently installed at a facility, such as a petrochemical plant or petroleum refinery, between a sampling location and a gas analyzer for analyzing the sample.

In operation, a sample of a process gas ("sample gas") is withdrawn from a sampling location (e.g., a stack, etc.) and then cooled somewhat. The cooling is performed passively, such as by exchanging heat with a cooler process stream from elsewhere in the system, as discussed further below, and/or by passing the sample gas through an extended length of tubing exposed to the (relatively cooler) ambient (facility) environment.

Cooling the sample gas results in condensation of moisture, which occurs (mostly) in a condensate-removal element, such as, without limitation, a coalescing filter or an impinger. The condensate is drained from the condensate-removal element, which can also be used to remove any larger particulates from the sample gas. In some embodiments, the condensate-removal element itself is cooled, such as via an air amplifier and a heat sink.

The sample gas flows from the condensate-removal element to a membrane dryer. In some embodiments, filters and/or ammonia scrubbers are located downstream of the condensate-removal device and upstream of the dryer.

To prevent condensation from occurring as the sample gas flows to the dryer, the sample gas is heated slightly (i.e., a few degrees centigrade) after leaving the condensate-removal device. This prevents condensation from occurring in the tubing leading from the condensate-removal device to the dryer, or in the dryer itself. In some embodiments, heating is performed via heat exchange with the incoming sample gas, as mentioned above. That is, the hot sample gas entering the hybrid cooler/dryer loses some heat to the cooler sample gas leaving the condensate-removal device.

The sample gas then enters a membrane dryer. In some embodiments, the membrane dryer comprises Nafion™ tubing, which is a sulfonated tetrafluoroethylene based fluoropolymer-copolymer. Nafion™ is extremely selective at transferring moisture across its surface, such as from one flowing gas stream (typically on the inside of the Nafion™ tube(s)) to another (on the outside of the tube). Nafion™ is commercially available from Perma Pure, LLC of Lakewood, N.J. Although the use of Nafion™ is preferred, other types of membranes that selectively transfer moisture may suitably be used.

In some embodiments, the membrane dryer is configured as multiple tubes of Nafion™ residing within an outer shell. The sample gas flows through the tubes of Nafion™. A relatively dryer purge-gas, which in the illustrative embodiment is dry instrument air, flows over the outside of the Nafion™ tubes, countercurrent with respect to the sample gas. By virtue of the ability of Nafion™ to selectively remove moisture from a gas, the hybrid cooler/dryer is capable of reducing the dew point of the sample to 4° C. or less.

Depending on the type of sample being withdrawn and the location in a facility from whence it's withdrawn, the sample may enter the hybrid cooler/dryer at a temperature in the range of 20° C. to 120° C. Depending on the location of the facility, ambient temperature can be in the range of about 00 to about 50° C. More extreme environments might require additional insulation, as familiar to those skilled in the art.

As previously mentioned, embodiments of the invention provide a passive system with no electronics, thereby enabling its use in explosive environments. Additionally, due to the relatively higher temperatures at which the present hybrid cooler/dryer operates, as compared to a Peltier or thermoelectric cooler, relatively more sulfur dioxide remains in the sample gas than condensing coolers. Consequently, embodiments of the invention obtain a more accurate determination of sulfur dioxide content in the actual process stream than such prior art systems.

DETAILED DESCRIPTION

The terms below are provided with the following explicit definitions for use in this disclosure and the appended claims:

The phrase "shell side" of a membrane dryer means the region on the outside of the tubes of the drying membrane (e.g., PFSA, etc.) and inside of the outer tube that contains the tubes of the drying membrane.

The phrase "tube side" of a membrane dryer means the region within the tubes of the drying membrane (e.g., PFSA, etc.).

The phrase "purge gas" means a gas that is introduced to the shell side of a membrane dryer, which is to be swept over the outside of the tubes for assisting in removing moisture from a gas that flows within the tubes.

The terms "substantially" and "about" mean within +/−15 percent of a nominal value.

The term "gas" means one or more gases (a substance having a single defined thermodynamic state at room temperature) and/or one or more vapors (a substance in which the gas phase and liquid phase can co-exist). For example, "flue gas" typically includes both gas and vapor, and more than one of each.

Embodiments of the invention are useful for conditioning vapor-phase samples, such as may be obtained from petrochemical facilities, petroleum refineries, or the like to provide condensate removal, particulates removal, and drying, prior to analysis in a gas analyzer.

Figure 1:
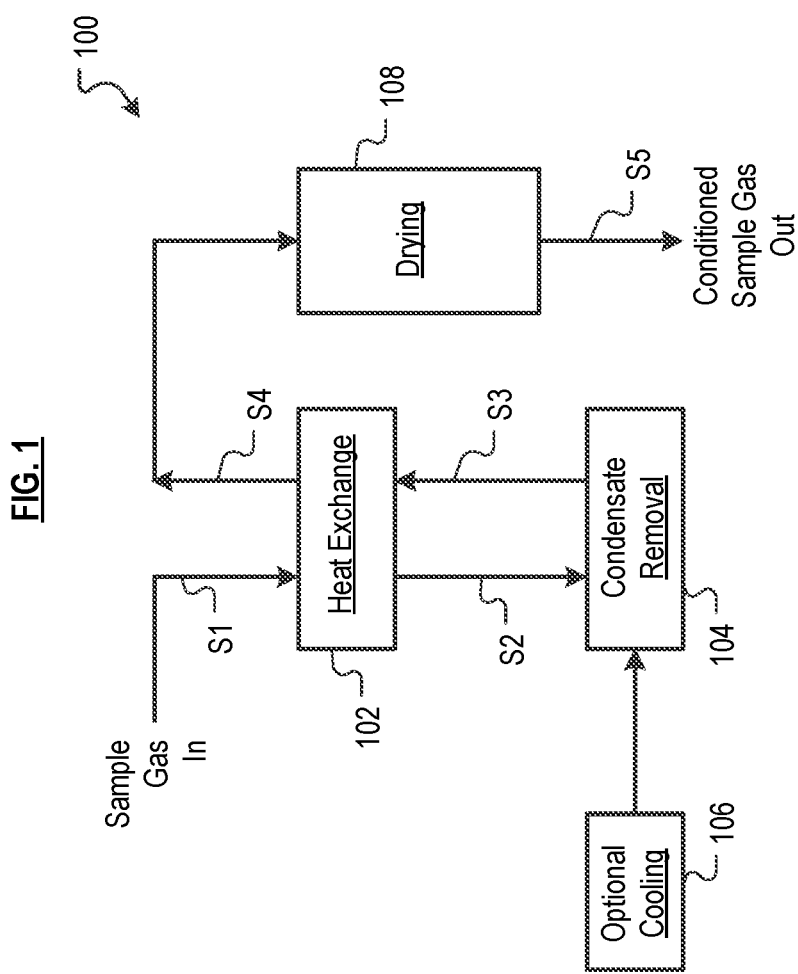
FIG. 1 depicts a hybrid cooler/dryer in accordance with the present teachings.

FIG. 1 depicts the salient unit operations of hybrid cooler/dryer 100 in accordance with the present teachings. Those operations include: heat exchange 102, condensate removal 104, and drying 108. In some embodiments, hybrid cooler/dryer includes cooling operation 106.

In some embodiments, heat exchange 102 is effected by positioning a first conduit, through which a relatively warmer fluid flows, against a second conduit, through which a relatively cooler fluid flows. For example, in some embodiments, a length of the first conduit and a length of the second conduit physically abut one another, such that the relatively warmer fluid flowing through the first conduit transfers some heat to the relatively cooler fluid flowing through the second conduit. The relatively warmer fluid therefore cools somewhat, whereas the relatively cooler fluid heats somewhat. The temperature change of the fluids can be as little as only a few degrees as a consequence of this heat exchange.

Thus, in FIG. 1, the sample gas has first state S1, as a function of its temperature and composition, when it enters the hybrid cooler/dryer 100. It then cools to second state S2 after heat exchange 102. Meanwhile, the sample gas leaving the condensate-removal 104 has third state S3 (which differs from second state S2 by composition and in some embodiments temperature), which then changes to fourth state S4 after heating after heat exchange 102.

In some other embodiments, heat exchange 102 is accomplished via a heat exchanger proper, such as a shell-and-tube heat exchanger. Since hybrid cooler/dryer 100 is relatively small (i.e., it typically fits within an enclosure that is about 600 mm×250 mm×120 mm) and the gas flows are relatively low, the shell-and-tube exchanger will be quite small, and will typically be embodied as a single tube within a larger tube. Tubing diameter will typically be in the range of 2 to 8 mm internal diameter.

In some embodiments, condensate removal 104 is effected via a knockout/condensate impinger, which can additionally remove particles 10 microns or larger in size, as well as acid mist. In some other embodiments, a coalescing filter is used for the same purpose.

In some embodiments, condensate removal 104 is accompanied by optional passive cooling 106 (in addition to the cooling provided via heat exchange 102). Although there are variety of well-known approaches for providing cooling, it is desirable to do so in a way that avoids the use of power in/near the hybrid cooler/dryer 100. This may be required due to the regulations of the facility in which the hybrid cooler/dryer is being used. In some such embodiments, cooling 106 is provided via an air amplifier that blows air over a heat sink that is thermally coupled to the condensate-removal device.

The sample gas is dried in drying operation 108, transitioning from state S4 to S5. In some embodiments, drying is effected via a membrane dryer. In some embodiments, the membrane dryer comprises a PFSA tubing, such as Nafion™. In such embodiments, the gas sample is typically drawn through the Nafion™ tubes, and a purge gas is passed over the outside of the tubes. The driving force for drying is the difference in water partial pressure across the Nafion™ tubes. In some embodiments, the purge gas is instrument air or other dry air, because the drier the air, the greater the ability of the dryer to dry the sample gas. In some embodiments, the purge gas is held under vacuum, which also increases drying action. In some embodiments, the purge gas is flowed in countercurrent fashion with respect to the sample gas.

In some embodiments, heat exchange 102 and condensate removal 104 is effected by a single integrated device. In some embodiments, heat exchange 102, condensate removal 104, and drying 108 is performed by a single integrated device.

Figure 2:
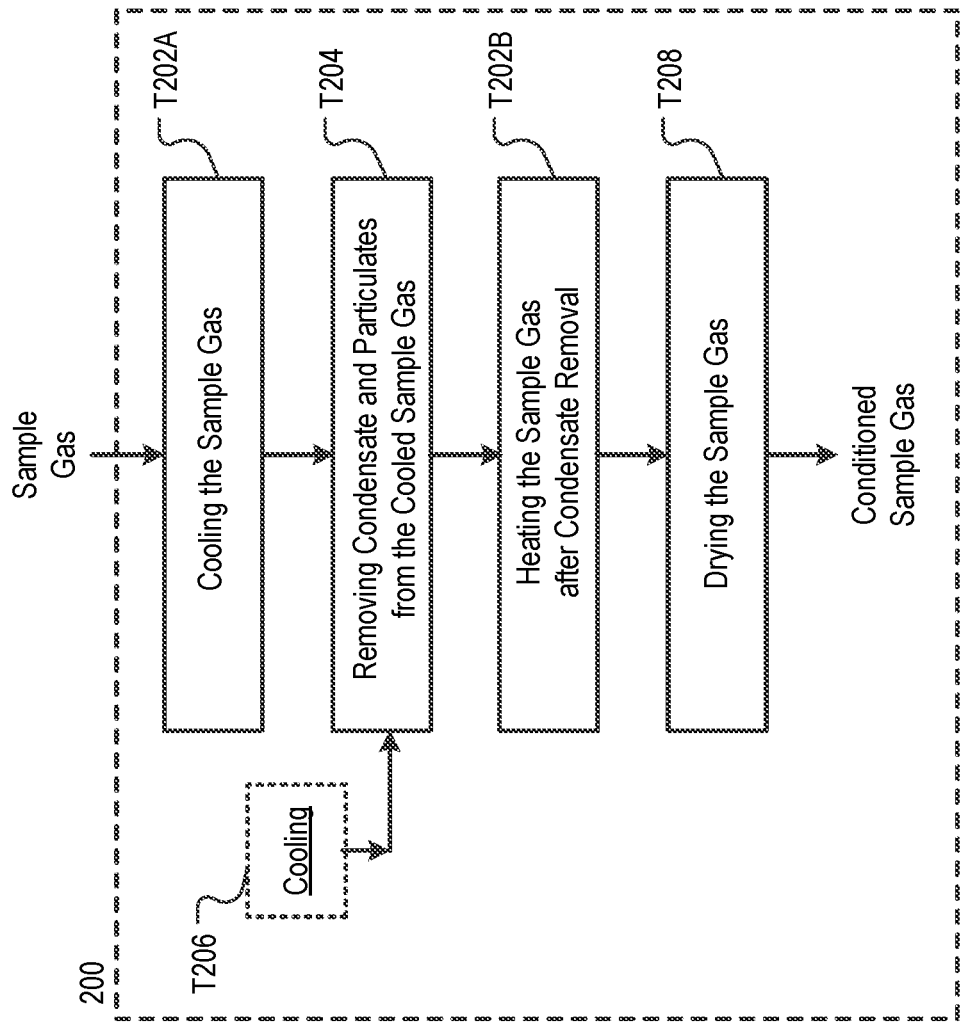
FIG. 2 depicts a method for conditioning a sample gas in accordance with the illustrative embodiment of the present invention.

FIG. 2 depicts method 200 for cooling/drying a gas stream. In accordance with task T202A, a sample gas is cooled, such as via heat exchange against another somewhat cooler stream. This is depicted in FIG. 1, wherein the sample gas is cooled from state S1 to state S2. In task T204, condensate resulting from the cooling of task T202A, as well as any cooling resulting from task T206, is removed/separated from the sample gas. In some embodiments, particulates larger than about 2 microns are also removed from the sample gas. As disclosed in conjunction with the discussion of FIG. 1, condensate removal can be accomplished, for example and without limitation, using a knockout/condensate impinge, coalescing filter, or the like.

After condensate removal, and per task T202B, the condensate-free sample gas is heated from state S3 to S4 (FIG. 1). Such heating raises the temperature of the sample gas enough to prevent further condensation. Based on sample conditions, ambient conditions, etc. The amount of heating will be in the range of about 1° to about 30° C. Quite unexpectedly, the performance of the Nafion™ dryer was improved at high ambient temperatures when the amount of heating is relatively low, such as in a range of about 10 to about 3° C. It was also surprising that even very small amounts of condensation entering the dryer resulted in dramatic performance decreases.

In accordance with task T208, the sample gas is dried. In this task, a substantial portion of the moisture in sample gas is removed such that upon leaving the dryer, the dew point of the sample gas is less than 4° C. At this point, the sample gas is suitably conditioned to be introduced to a gas analyzer. In some embodiments the dryer is split into two sections, which includes a primary dryer to remove the majority of the moisture, and a polisher (a supplemental dryer) before the analyzer to ensure the dew point of the sample gas is less than 4° C.

Figure 3:
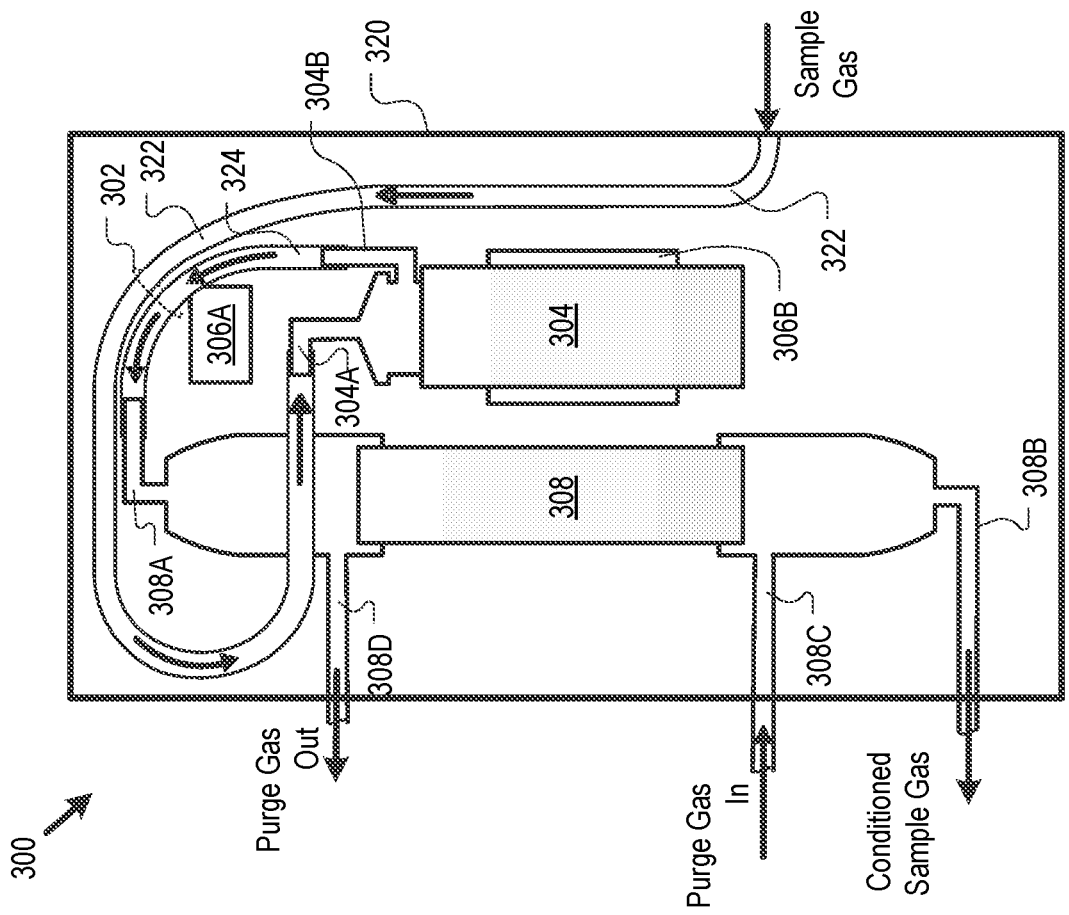
FIG. 3 depicts a first embodiment of a hybrid cooler/dryer in accordance with FIG. 1.

FIG. 3 depicts hybrid cooler/dryer 300 in accordance the present teachings, which is a first illustrative embodiment of hybrid cooler/dryer 100 of FIG. 1.

The salient features of hybrid cooler/dryer 300 include heat-exchanger 302, knockout impinger 304 and dryer 308. The knockout impinger and dryer are fluidically coupled to one another. Hybrid cooler/dryer 300 includes cooling for knockout impinger 304, which is provided by air amplifier 306A and heat sink 306B. The arrows depict the path of sample gas through the system.

Knockout impinger 304 is a commercially available device that is well-known to those skilled in the art. Impingers can be used for a variety of purposes; in the present case, the impinger is used for condensate removal, particulates removal, and for removing acid mist from the sample gas.

Dryer 308 is a membrane dryer, which, in the embodiment depicted in FIG. 3, utilizes Nafion™ tubing. Nafion™ is a sulfonated tetrafluoroethylene based fluoropolymer-copolymer, which is a type of perfluorosulfonic acid (PFSA) membrane. As previously discussed, Nafion™ is extremely selective at transferring moisture across its surface, such as from one flowing gas stream (typically on the inside of the Nafion™ tube) to another (on the outside of the tube). In some embodiments, dryer 308 is commercially available from Perma Pure, LLC of Lakewood, N.J., as model PD-200T-24. Such a dryer has a length of 24 inches and contains 200 parallel tubes of 0.030 inch diameter Nafion™ within a shell. However, in some other embodiments, other membranes suitable for removing moisture from gas streams can suitably be used as dryer 308.

Figure 4:
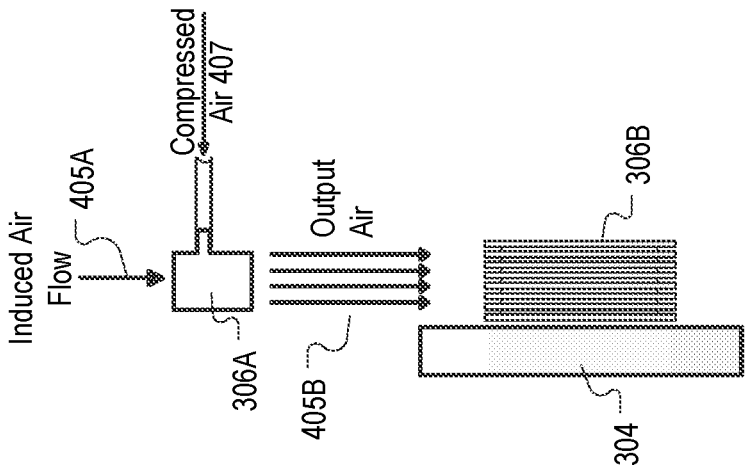
FIG. 4 depicts a side view of the hybrid cooler/dryer of FIG. 3, showing a notional arrangement for providing cooling for the impinger.

FIG. 4 depicts further detail of the cooling provided for knockout impinger 304, which, as previously disclosed, includes air amplifier 306A and heat sink 306B. Air amplifier 306A is a conventional device for producing a high volume, high-velocity flow of air using a small amount of compressed air, in known fashion. Heat sink 306B, which is thermally coupled to knockout impinger 304, is a passive heat-exchange element. In the illustrative embodiment, heat sink 306B is implemented as a plurality of straight fins.

With continuing reference to FIGS. 3 and 4, in operation, the sample gas enters tubing 322 flowing towards inlet 304A of impinger 304. Before reaching the inlet, the sample gas is cooled by at least a few degrees (i.e., about 1 to 3° C.) via heat-exchange arrangement 302.

In this embodiment, heat-exchange arrangement 302 is implemented by positioning tubing 322, which carries the sample gas as sampled (highest temperature), against tubing 324, which carries the sample gas after exiting the impinger (lower temperature). Some heat is therefore transferred from the hot sample gas in tubing 322 to the sample gas in tubing 324 flowing towards dryer 308. This has the effect of slightly cooling the sample gas flowing towards the impinger and slightly heating the sample gas flowing towards the dryer.

The sample gas flowing to inlet 304A of impinger 304 is thus slightly cooler than the freshly obtained sample gas. The sample gas is further cooled in impinger 304 via the cooling provided by air amplifier 306A and heat sink 306B. In particular, compressed air 407, which is introduced into air amplifier 306A, induces a flow of air 405A therein, generating a high volumetric flow of air 405B that is directed over heat sink 306B (which is attached to the impinge. This further cools the sample gas as it flows through impinger 304. As initially received, the sample gas has a temperature of about 80° C., although that temperature can be as low as about 20° C. and as high as about 120° C., depending on its source in a power plant or petrochemical/refining facility.

As a result of the cooling that occurs via heat-exchange arrangement 302 and via the air amplifier 306A and heat sink 306B, water condenses from sample gas. This condensate is removed from the sample gas via action of impinger 304. In some embodiments, the condensate is removed from impinger 304 via a peristaltic pump (not depicted). In some other embodiments, the condensate is removed from impinger 304 using an eductor (not depicted). Additionally, large particulates and acid mist present in the sample gas are removed in impinger 304.

The sample gas leaves impinger 304 through outlet 304B and flows, through tubing 324, towards tube-side inlet 308A of dryer 308. As previously discussed, before reaching the dryer, sample gas is heated a few degrees via the action of heat-exchange arrangement 302. This small amount of heating prevents any condensation from occurring in tubing 324. Keeping the amount of heating small results in improved drying performance of the Nafion™ tubes at high ambient temperatures, with the surprising result that this simple and passive system has better drying performance than applicant's own more sophisticated electrically controlled and heated Nafion™ conditioning systems at high (50° C.) ambient temperatures.

The sample gas enters dryer 308 and flows through the Nafion™ tubing (not depicted) toward tube-side outlet 308B. Purge gas flows into shell-side inlet 308C of dryer 308. The purge gas, which in the illustrative embodiment is "instrument air," is drawn across the "outside" of the Nafion™ tubing. The purge gas flows in countercurrent fashion with respect to the sample gas. The purge gas leaves dryer 308 through shell-side outlet 308D. The difference in the vapor pressure of water between the sample gas and the purge gas drives moisture, in highly selective fashion, from the sample gas into the purge gas. In some embodiments, the purge gas is pushed through via pressurized instrument air. In some embodiments, the purge gas is drawn under a vacuum of 0.1 to 0.8 bar absolute. The conditioned sample gas exits dryer 308 through tube-side outlet 308B and passes to a gas analyzer (not depicted).

Because the system does not contain any electrical heating or temperature control, the temperature of the sample gas within the system will be accordingly affected by ambient temperature. In some embodiments, at an ambient temperature of 25° C. and inlet sample gas temperature of 100° C., the sample gas enters knockout impinger 304 at about 78° C. and exits at about 60° C. The sample gas exiting the knockout impinger is then heated by about 2° to 3° C. between outlet 304B of impinger 304 and inlet 308A of dryer 308. The conditioned sample gas exits the dryer at a temperature of about 30° C. and having a dew point of less than 0° C. At ambient temperatures close to 5° C., the impinger exit could be as low as 20° C. At ambient temperature close to 50° C., the impinger exit could be as high as 75° C.

It will be appreciated by those skilled in the art that hybrid cooler/dryer 300 includes various auxiliary elements that are not depicted in FIG. 3. For example, hybrid cooler/dryer 300 may use a pump, eductor, etc., for removing condensate from impinger 304, and an eductor/vacuum pump, etc., for drawing purge gas through dryer 308.

Figure 5B:
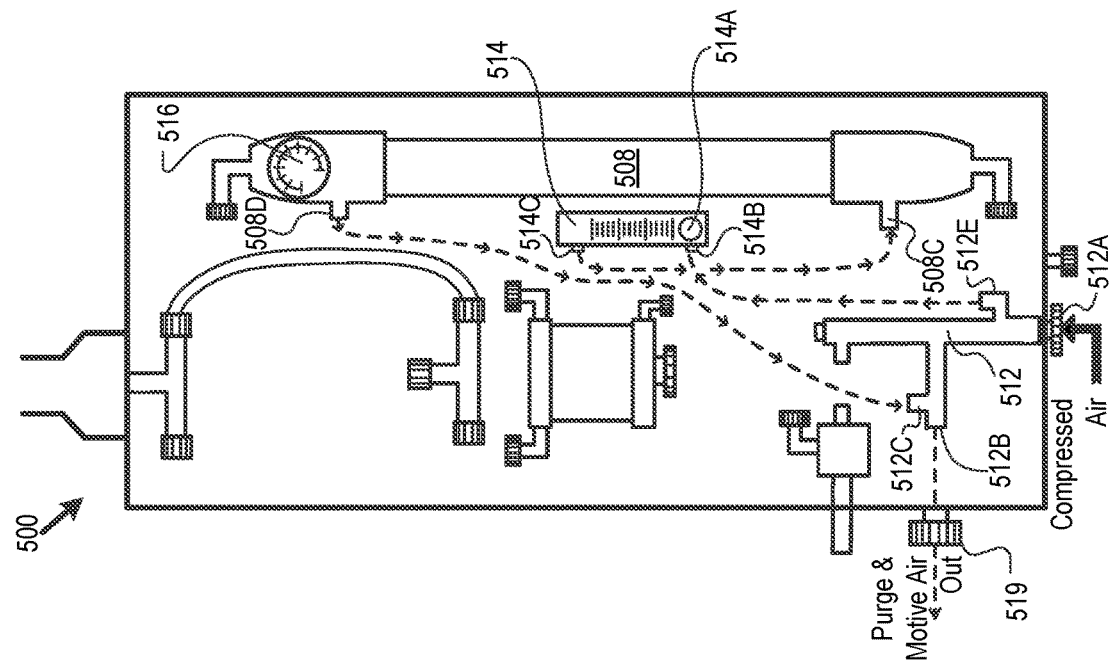
FIG. 5B depicts, for the second embodiment of the hybrid cooler/dryer, the flow of the purge gas used for the dryer.
Figure 5A:
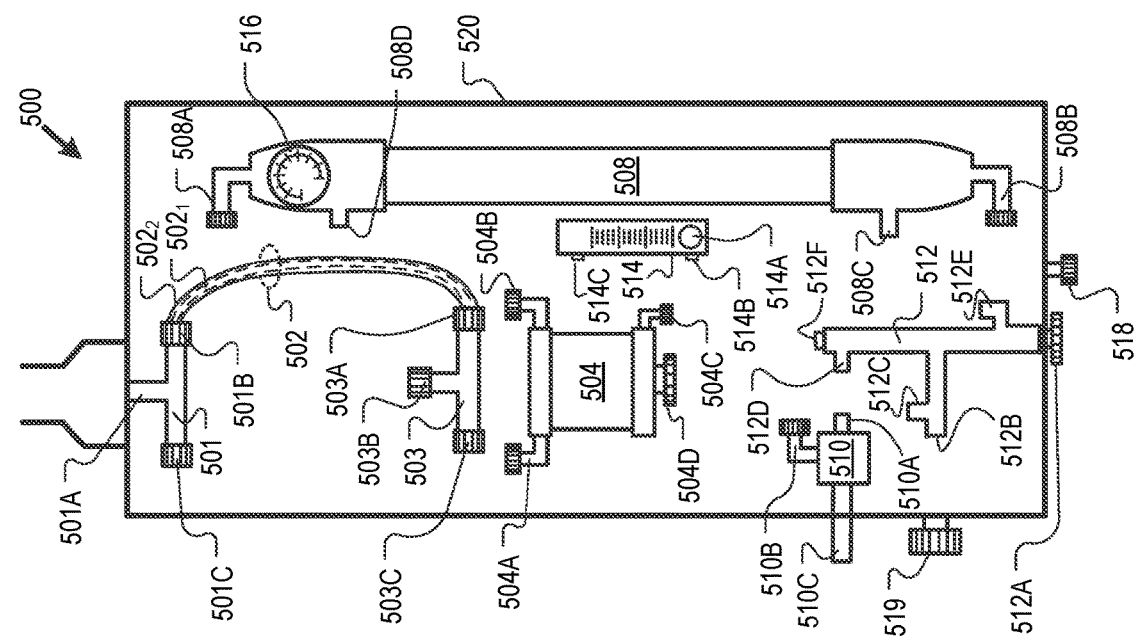
FIG. 5A depicts a second embodiment of a hybrid cooler/dryer in accordance with FIG. 1.

FIG. 5A depicts hybrid cooler/dryer 500 in accordance the present teachings, which is a second illustrative embodiment of hybrid cooler/dryer 100 of FIG. 1.

The salient features of hybrid cooler/dryer 500 includes heat exchanger 502, coalescing filter 504, and dryer 508. For the sake of clarity, tubing that fluidically couples various elements of the hybrid cooler/dryer to one another is not depicted in FIG. 5A. Such tubing is understood to be present and appropriately connected to the various ports to support the flow of fluid throughout the hybrid cooler/dryer, as depicted via dashed lines in FIGS. 5B through 5D.

Fitting 501 fluidically couples, via port 501A, to a sample line (not depicted) that delivers sample gas to hybrid cooler/dryer 500. Fitting 501 fluidically couples to a first end of heat exchanger 502 via port 501B. Heat exchanger 502 includes two tubes, inner tube 502I and outer tube 502O. Fitting 503 fluidically couples, via port 503A, to the other end of heat exchanger 502.

Figure 5D:
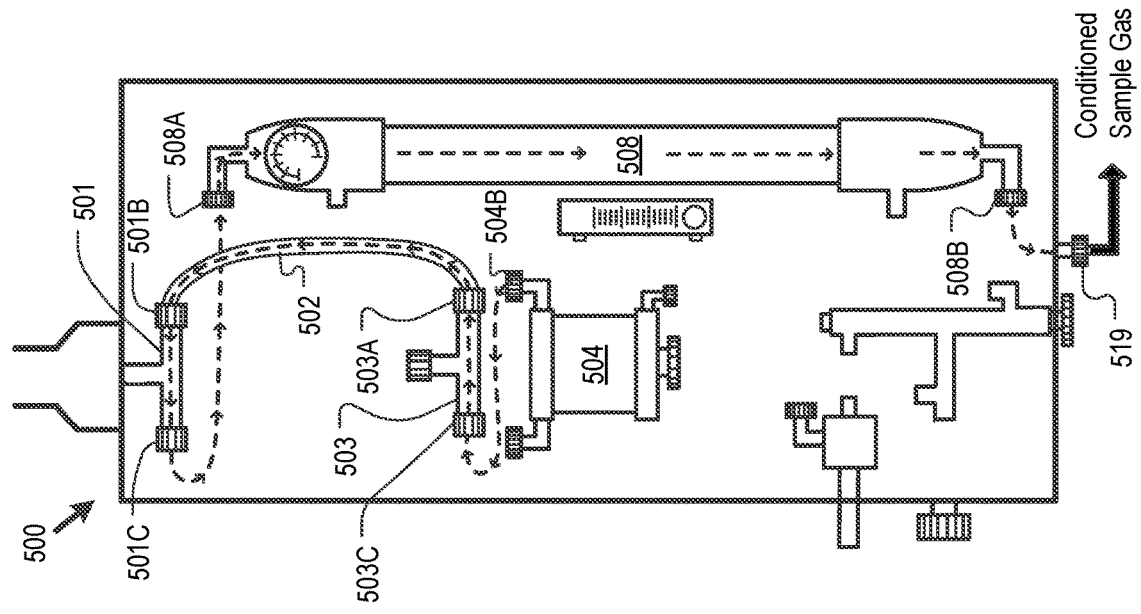
FIG. 5D depicts, for the second embodiment of the hybrid cooler/dryer, the flow of sample gas from the point at which it exits the condensate-removal device through drying in the dryer to provide a conditioned sample gas.
Figure 5C:
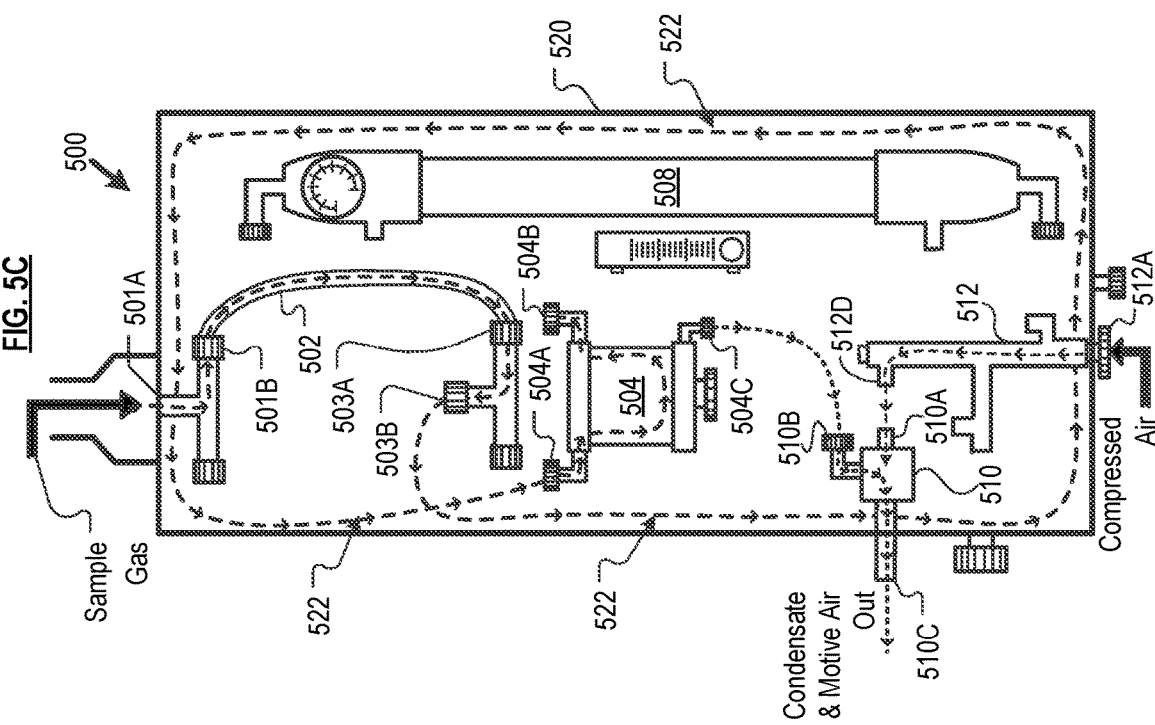
FIG. 5C depicts, for the second embodiment of the hybrid cooler/dryer, the flow of sample gas up to the point at which it exits the condensate-removal device.

Coalescing filter 504 receives sample gas after it is cooled in heat exchanger 502 and optionally further cooled in additional tubing, as discussed in conjunction with FIG. 5C. Any condensate resulting from such cooling is removed from the sample gas in coalescing filter 504, the condensate appearing as drops of water on a filter material therein. In some embodiments, the filter material is glass fiber, having a diameter of 0.01 microns; however, other filter materials may suitably be used. The filter also removes particulates greater than about 2 microns that are carried by the sample gas, as well as acid mist. Thumb screw 504D can be used to access the inside of coalescing filter 504, so that the filter material therein can be periodically replaced and/or regenerated. Coalescing filter 504 includes inlet port 504A, outlet port 504B, and condensate drain port 504C.

After exiting coalescing filter 504 and heating in heat exchanger 502 against the relatively warmer incoming sample gas, the sample gas enters membrane dryer 508. Membrane dryer 508 includes sample gas inlet 508A, sample gas outlet 508B, purge gas inlet 508C, and purge gas outlet 508D. Like dryer 308 of hybrid cooler/dryer 300, membrane dryer 508 uses Nafion™ tubing. In some embodiments, a model PD-200T-20 dryer, commercially available from Perma Pure, LLC of Lakewood, N.J., is used for this purpose. This dryer has a length of 20 inches and contains 200 parallel tubes of 0.030 inch diameter Nafion™ within a shell. However, in some other embodiments, other membrane dryers using other types of membranes suitable for removing moisture from gas streams can suitably be used.

Also depicted in FIG. 5A is eductor 510, having ports 510A, 510B, and 510C. Eductor 510 provides a suction flow for drawing condensate from coalescing filter 504.

Eductor/air distributor 512, having ports 512A, 512B, 512C, 512D, and 512E, provides several functions. It receives compressed air for driving eductor 510, for establishing a vacuum on the dryer purge gas, and for delivering purge gas to dryer 508. Flow meter 514 receives compressed air that is intended as purge gas for dryer 508. Flow control knob 514A is used to regulate the flow of purge air to dryer 508.

The operation of hybrid cooler/dryer 500 is now discussed in conjunction with FIGS. 5B through 5D. A dashed line with arrows indicates a flow of fluid in the direction indicated between ports. It is to be understood that tubing, although not depicted for clarity, is present between the various ports to support the indicated fluid flow.

FIG. 5B depicts the flow of purge gas through hybrid cooler/dryer 500. Compressed air enters the eductor/air distributor 512 through port 512A and is received by flow meter 514 via port 514B. Knob 514A controls the flow of air—purge gas—from outlet 514C to purge gas inlet 508C located near the bottom of dryer 508. Compressed air entering eductor/air distributor 512 also flows through port 512B. Purge gas exiting dryer 508 though port 508D flows to port 512C of eductor/air distributor 512. This arrangement places the purge gas under vacuum, as controlled by the flow of air through port 512B. Vacuum gauge 516 provides an indication of the level of vacuum. Air and purge gas are removed from the system via purge gas outlet port 519.

FIG. 5C depicts the flow of sample gas to coalescing filter 504. Sample gas enters hybrid cooler/dryer 500 at inlet port 501A, flows through port 501B and into heat exchanger 502. In the illustrative embodiment, the hot sample gas flows through inner tube 502I (FIG. 5A). However, in other embodiments, the hot sample gas entering at port 501A enters heat exchanger 502 in the annular region defined between the exterior of inner tube 502I and the interior of outer tube 502².

The sample gas flows out of heat exchanger 502 through port 503A, and out of fitting 503 through port 503B. In the illustrative embodiment, after passing port 503B, the sample gas, now cooled by a few degrees, passes into a passive cooler before entering coalescing filter 504.

In the illustrative embodiment, the passive cooler is embodied as passive cooling loop 522, which is an extended length of tubing. Flowing through the passive cooling loop and exposed to the ambient temperature within housing 520, which is typically at least about 20° C. cooler than the temperature of the cooled sample gas leaving heat exchanger 502, the sample gas cools further. Assuming an ambient temperature as high as about 50° C., the sample gas cools to about 60° C. prior to entering the coalescing filter. In some other embodiments, other arrangements for passive cooling are suitably used.

The sample gas enters the coalescing filter via inlet port 504A and passes through the filter material therein. Moisture condensing from the sample gas accumulates in coalescing filter 504, and is drawn off through port 504C via the action of eductor 510. Specifically, compressed air from eductor/air distributor 512, exiting port 512D thereof, enters eductor 510 at port 510A. The compressed air flowing through the eductor and out through eductor outlet 510C draws condensate through port 504C to the eductor's port 510B. The condensate is then removed from the system with the motive air through outlet port 510C.

FIG. 5D depicts the flow of sample gas out of coalescing filter 504 and through dryer 508.

Condensate-free sample gas exits the coalescing filter through outlet port 504B, is received by port 503C of fitting 503, and enters the heat exchanger's inner tube 502I (FIG. 1). The inner tube 502I continues through port 503A to enter heat exchanger 502. The condensate-free sample gas flows countercurrent with respect to the hot sample gas that is flowing through the annular region between the outside of inner tubing 502I and the inside of outer tubing 502².

The inner tube 502I passes through port 501B and condensate-free sample gas exits heat exchanger fitting 501 via port 501C, flowing towards dryer 508. The condensate-free sample gas heats by about 1 to 3° C. flowing through heat exchanger 502. If the sample gas flowed directly from coalescing filter 504 to dryer 508, it is possible that the sample gas would cool somewhat and moisture would condense. This is undesirable for the operation of dryer 508.

Thus, sample gas flows from port 501C to dryer inlet port 508A. The sample gas passes through tubular drying membranes (not depicted) within dryer 508 and exits the dryer through dryer outlet port 508B. As previously discussed, in the illustrative embodiment, the drying membranes are tubes of Nafion™. Dry purge gas flowing over the exterior of the Nafion™ tubes provide the driving force for moisture removal. The now conditioned sample gas passes from outlet port 508B and flows to and through sample gas outlet port 519. The conditioned (i.e., dry, etc.) gas then flows to a gas analyzer (not depicted).

Figure 6:
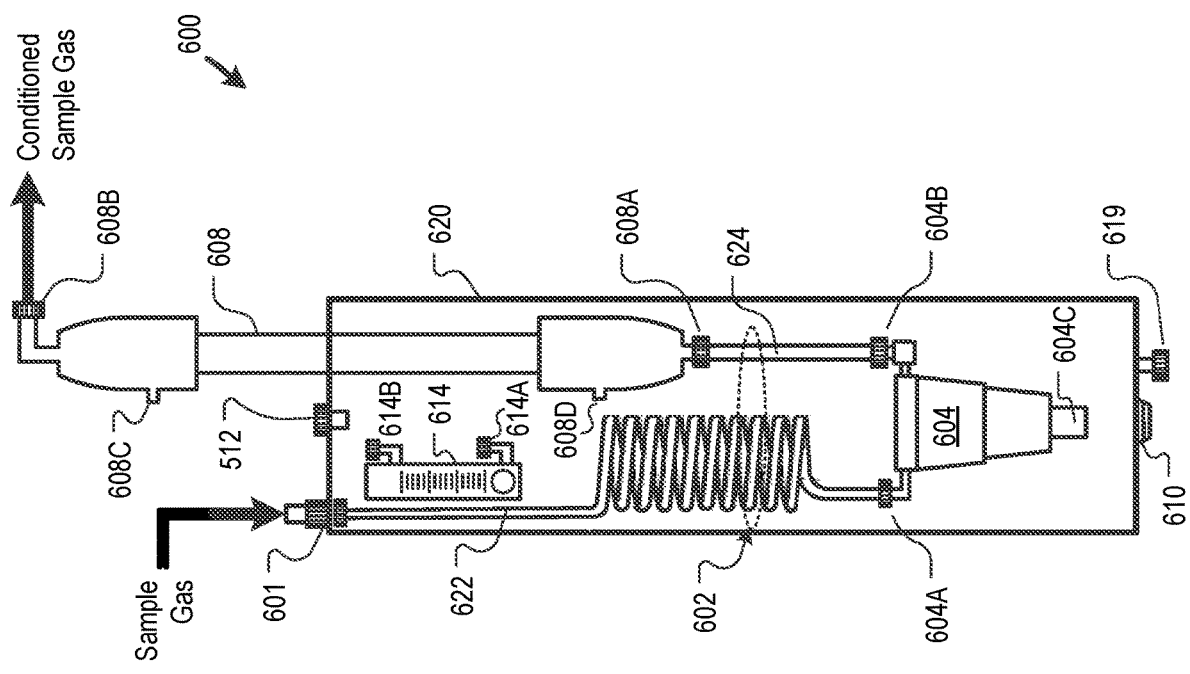
FIG. 6 depicts a third embodiment of a hybrid cooler/dryer in accordance with FIG. 1.

FIG. 6 depicts hybrid cooler/dryer 600 in accordance the present teachings, which is a third illustrative embodiment of hybrid cooler/dryer 100 of FIG. 1.

The salient features of hybrid cooler/dryer 600 includes heat exchanger 602, coalescing filter 604, and dryer 608. These elements are at least partially contained in housing 620. For the sake of clarity, tubing that carries pressurized air, such as is used as purge gas for dryer 608, and the tubing that conveys condensate out of the coalescing filter is not depicted in FIG. 6. Such tubing is understood to be present and appropriately connected to the various ports to support the flow of purge gas and condensate.

Fitting 601 fluidically couples to a sample line (not depicted) that delivers sample gas to passive-cooling conduit 622. To increase the length of passive-cooling conduit 622 in the relatively confined space of housing 620, a portion of the conduit is in a convoluted form, such as a spiral, etc. The additional length provided by the convoluted form provides of passive-cooling conduit 622 provides additional opportunity for the hot sample gas within the conduit to transfer heat to the ambient environment (which is typically about 30 to 40° C. cooler). Furthermore, although passive-cooling conduit 622 does not physically touch conduit 624 leading from outlet port 604B of coalescing filter 604 to inlet port 608A of dryer 608, the proximity of these two conduits to one another does result in some heat exchange. Again, this is particularly the case when the elements of the hybrid cooler/dryer 600 are contained within housing 620.

The cooled sample gas passes from passive-cooling conduit 622 to coalescing filter 604 through inlet port 604A. Any condensate resulting from such cooling is removed from the sample gas in coalescing filter 604, the condensate appearing as drops of water on a filter material therein. In some embodiments, the filter material is glass fiber, having a diameter of 0.01 microns; however, other filter materials may suitably be used. The filter also removes particulates greater than about 2 microns that are carried by the sample gas, as well as acid mist. The filter material in the coalescing filter is periodically replaced and/or regenerated. Condensate is removed from coalescing filter 604 through drain port 604C. Condensate is removed from the system through port 610.

After exiting coalescing filter 604 and heating as it passes through conduit 624, the sample gas enters membrane dryer 608 through inlet port 608A. Like dryers 308 and 508 previously discussed, membrane dryer 608 includes sample gas inlet port 608A, sample gas outlet port 608B, purge gas inlet port 608C, and purge gas outlet port 608D. Like the aforementioned dryers, membrane dryer 508 uses Nafion™ tubing. However, in some other embodiments, other membrane dryers using other types of membranes suitable for removing moisture from gas streams can suitably be used.

Unlike the previously discussed embodiments, the sample gas proceeds "upflow" through dryer 608. Purge gas flows countercurrent to the sample gas, such that it enters through purge gas inlet port 608C and exits through purge gas outlet port 608D. It is notable that a portion of dryer 608 extends outside of housing 620. This is because the upper portion of dryer 608 need not be thermally coupled to the heat exchanger within housing 520.

Compressed air inlet 512 receives compressed air that is delivered to port 614A of purge gas flow meter 614. Purge gas flows from the flow meter through outlet port 614B to purge gas inlet port 608C.

Figure 7:
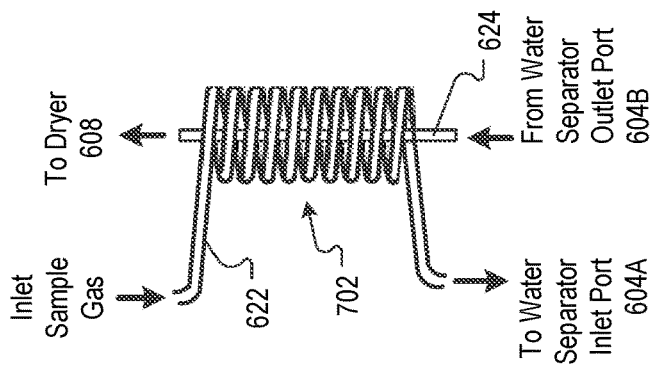
FIG. 7 depicts an alternative embodiment of the hybrid cooler/dryer depicted in FIG. 6.

FIG. 7 depicts an alternative embodiment of hybrid cooler/dryer 600, wherein conduit 624 (from coalesce outlet to dryer inlet) passes through the opening created by the convoluted portion of passive-cooling conduit 622, defining heat exchanger 702.

Figure 8:
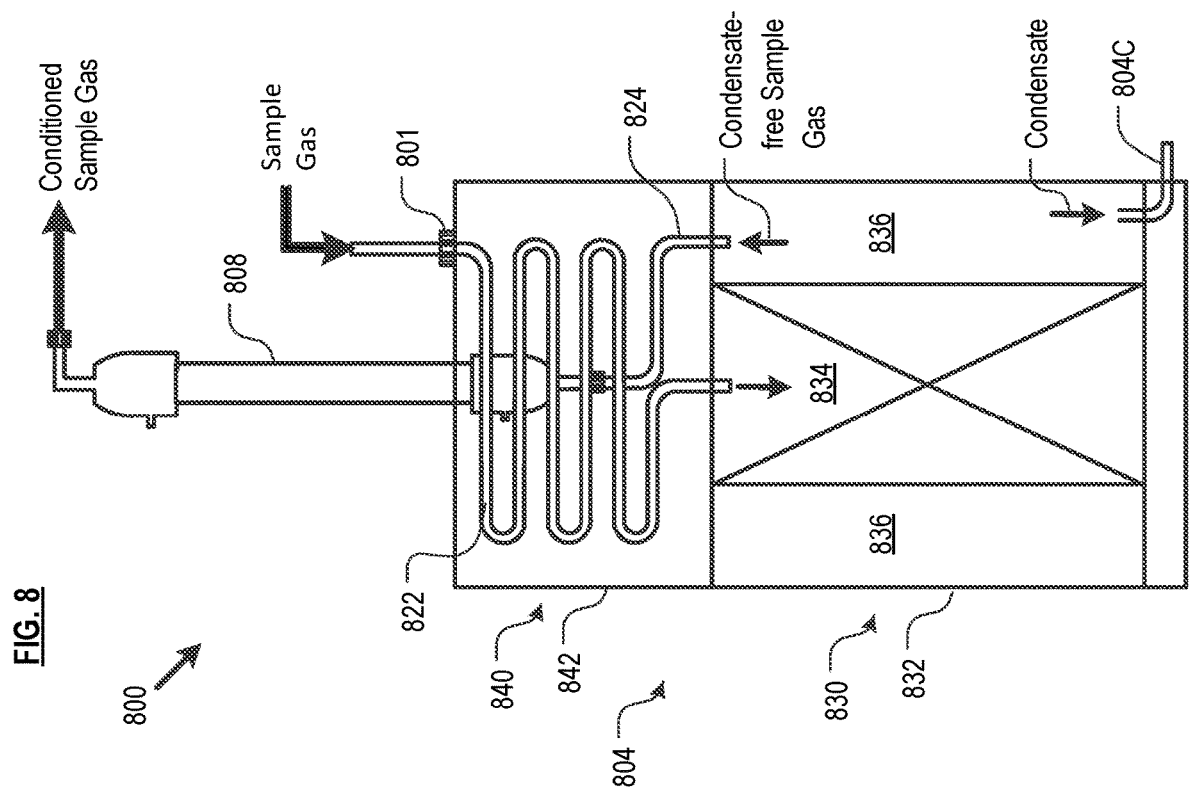
FIG. 8 depicts a fourth embodiment of a hybrid cooler/dryer in accordance with FIG. 1.

FIG. 8 depicts hybrid cooler/dryer 800 in accordance the present teachings, which is a fourth illustrative embodiment of hybrid cooler/dryer 100 of FIG. 1.

In this embodiment, the main unit operations of the hybrid cooler/dryer (i.e., see, FIG. 1: heat exchange, condensate removal, and drying) are performed via a single integrated device. That is, hybrid cooler/dryer 800 includes combined heat exchanger and condensate removal device (HECRD) 804.

HECRD 804 has lower portion 830 comprising filter housing 832 and filter 834 disposed therein. Annular region 836, which is formed between the inside of housing 832 and the outer surface of filter 834, accumulates condensate that is removed from the sample gas. Condensate is removed from annular region 836 via outlet port 804C.

HECRD includes upper portion 840, defined with housing 842, in which heat exchange occurs. In particular, passive cooling conduit 822 is proximal to conduit 824, which conveys relatively cooler condensate-free sample gas from annular region 836. The lower portion of dryer 808 extends within upper portion 840 of HECRD 804. Thus, condensate-free sample gas enters dryer 808 within region 840. The gas proceeds upflow through dryer 808.

Dryer 808 can be the same type as disclosed for other embodiments; that is, a membrane dryer in which the drying membranes are tubes of Nafion™, although other types of membranes may be used. Dry purge gas is introduced into the dryer and flows over the exterior of the Nafion™ tubes to provide the driving force for moisture removal. For the sake of clarity, conduits that carry pressurized air for the dryer purge gas, and a purge-gas flow meter, etc., are not depicted.

In some embodiments, the conditioned sample gas leaving the dryer flows to a gas analyzer (not depicted). In some other embodiments, the sample gas flows to a "polisher," which is another stage of membrane drying before entering a gas analyzer.

Hybrid cooler/dryer 800 can be contained in a housing (not depicted), or coupled to a board.

In some other embodiments, dryer 808 is not integrated with HECRD 804 as in the embodiment of FIG. 8. Rather, no portion of dryer 808 extends into housing 842. In some further embodiments, first and second passages, rather than discrete tubes or conduits, can be formed in the upper portion 840 of HECRD 804.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A hybrid cooler/dryer for conditioning a sample gas, wherein the hybrid cooler/dryer comprises:
   a heat exchanger;
   a condensate-removal device; and
   a membrane dryer, wherein:
   (a) the heat exchanger is physically adapted to cool the sample gas before it enters the condensate-removal device;
   (b) the condensate-removal device is physically adapted to remove condensate from the sample gas;
   (c) the heat exchanger is physically adapted to heat condensate-free sample gas leaving the condensate-removal device before entering the membrane dryer; and
   (d) the membrane dryer is physically adapted to reduce a dew point of the condensate-free sample gas to less than 4° C., providing a conditioned sample gas.

2. The hybrid cooler/dryer of claim 1, wherein the heat exchanger comprises:
   a first tube carrying sample gas that has not entered the condensate-removal device; and
   a second tube carrying sample gas that has exited the condensate-removal device;
   wherein the first tube and the second tube are physically arranged to enable heat to flow from the sample gas in the first tube to the sample gas in the second tube.

3. The hybrid cooler/dryer of claim 2, wherein at least a portion of the first tube and a portion of the second tube abut one another.

4. The hybrid cooler/dryer of claim 2, wherein the first tube and the second tube are positioned concentrically, such that either the first tube is within the second tube or the second tube is within the first tube.

5. The hybrid cooler/dryer of claim 2, wherein the sample gas in the first tube cools by an amount in a range of about 1 to about 20 degrees centigrade.

6. The hybrid cooler/dryer of claim 2, wherein the sample gas in the second tube heats by an amount in a range of about 1 to about 20 degrees centigrade.

7. The hybrid cooler/dryer of claim 1, wherein electricity t used to power any elements of the hybrid cooler/dryer.

8. The hybrid cooler/dryer of claim 1 further comprising a passive cooler, wherein after exiting the heat exchanger and before removing condensate, the sample gas is further cooled by the passive cooler.

9. The hybrid cooler/dryer of claim 8, wherein the passive cooler comprises a third tube defining a passive cooling loop, wherein the third tube has a length that is greater than a length of the first tube.

10. The hybrid cooler/dryer of claim 1, wherein a temperature of the conditioned sample gas is a range of about 5 to about 50 degrees centigrade.

11. The hybrid cooler/dryer of claim 1, wherein the membrane dryer includes at least one tube comprising a perfluorosulfonic add (PFSA) membrane.

12. A hybrid cooler/dryer for conditioning a sample gas, wherein the hybrid cooler/dryer comprises:
    a heat exchanger, wherein the heat exchanger consists of a first tube and a second tube;
    a passive cooler;
    a coalescing filter, wherein the coalescing filter removes condensate from the sample gas; and
    a membrane dryer, wherein the membrane dryer dries the sample gas, reducing a dew point of the sample gas to less than 4° C., and further wherein:
        (a) the first tube is fluidically coupled to the passive cooler and the passive cooler is fluidically coupled to an inlet of the coalescing filter; and
        (b) the second tube is fluidically coupled to an outlet of the coalescing filter and the inlet of the membrane dryer.

13. The hybrid cooler/dryer of claim 12, wherein the passive cooler is a third tube that defines a passive cooling loop, wherein the third tube has a length that is greater than a length of the first tube.

14. The hybrid cooler/dryer of claim 12, wherein the membrane dryer includes at least one tube comprising a perfluorosulfonic acid (PFSA) membrane.

15. The hybrid cooler/dryer of claim 12, and further comprising a first eductor, wherein the first eductor draws the condensate from the coalescing filter.

16. The hybrid cooler/dryer of claim 12, and further comprising a second eductor, wherein the second eductor places, under vacuum, a purge gas that is introduced into the membrane dryer.

17. The hybrid cooler/dryer of claim 12, wherein the sample gas in the second tube heats by an amount in a range of about 1 to about 3 degrees centigrade.

18. A hybrid cooler/dryer for conditioning a sample gas, wherein the hybrid cooler/dryer comprises one or more means capable of providing heat exchange, condensate removal, and membrane drying, wherein the one or more means is physically adapted to:
    (a) cool the sample gas;
    (b) remove condensate from the cooled sample gas, thereby providing a condensate-free sample gas;
    (c) heat the condensate-free sample gas before the condensate-free sample gas is dried;
    (d) dry the heated, condensate-free sample gas to a dew point of less than thereby providing a conditioned sample gas.

19. The hybrid cooler/dryer of claim 18 wherein the one or more means comprises three discrete elements including an arrangement for heat exchange, a condensate-removal device, and a membrane dryer.

20. The hybrid cooler/dryer of claim 19, wherein the arrangement for heat exchange comprises a first tube and a second tube.

21. The hybrid cooler/dryer of claim 20 and further comprising a housing that contains the arrangement for heat exchange, the condensate removal device, and at least a portion of the membrane dryer, wherein:
    (a) the first tube includes a convoluted portion;
    (b) the second tube fluidically couples an outlet of the condensate-removal device to an inlet of the membrane dryer;
    (c) no portion of the first tube and the second tube abut one another.

22. The hybrid cooler/dryer of claim 18 wherein the one or more means consists of two discrete elements including (a) a combined heat exchanger and condensate-removal device, and (b) a membrane dryer.

23. The hybrid cooler/dryer of claim 18 wherein the one or more means consists of a single element that performs heat exchange, condensate removal, and membrane drying.

* * * * *